US012552697B1

(12) United States Patent
Shiner et al.

(10) Patent No.: US 12,552,697 B1
(45) Date of Patent: Feb. 17, 2026

(54) METHOD OF SEPARATING WASTE INTO BIO-AVAILABLE COMPONENTS

(71) Applicant: Fox Technology IP, LLC, Denver, CO (US)

(72) Inventors: Kirk Shiner, Greeley, CO (US); Justin Spaeth, Windsor, CO (US); Seth Peters, Windsor (AU)

( * ) Notice: Subject to any disclaimer, the term of this patent is extended or adjusted under 35 U.S.C. 154(b) by 523 days.

(21) Appl. No.: 17/990,560

(22) Filed: Nov. 18, 2022

Related U.S. Application Data

(60) Provisional application No. 63/280,778, filed on Nov. 18, 2021.

(51) Int. Cl.
| | |
|---|---|
| *C02F 9/00* | (2023.01) |
| *C02F 1/02* | (2023.01) |
| *C02F 1/24* | (2023.01) |
| *C02F 1/48* | (2023.01) |
| *C02F 11/125* | (2019.01) |
| *B01D 17/02* | (2006.01) |
| *C02F 1/00* | (2023.01) |
| *C02F 1/56* | (2023.01) |
| *C02F 1/66* | (2023.01) |
| *C02F 101/32* | (2006.01) |
| *C07K 1/36* | (2006.01) |
| *C11B 13/00* | (2006.01) |

(52) U.S. Cl.
CPC .............. *C02F 9/00* (2013.01); *C02F 1/02* (2013.01); *C02F 1/24* (2013.01); *C02F 1/48* (2013.01); *C02F 11/125* (2013.01); *B01D 17/02* (2013.01); *C02F 2001/007* (2013.01); *C02F 1/56* (2013.01); *C02F 1/66* (2013.01); *C02F 2101/32* (2013.01); *C07K 1/36* (2013.01); *C11B 13/00* (2013.01)

(58) Field of Classification Search
CPC ...... C02F 1/00; C02F 1/02; C02F 1/24; C02F 1/48–488; C02F 1/52–56; C02F 1/66; C02F 1/68–688; C02F 9/00; C02F 11/12–127; C02F 2001/007; C02F 2101/32–327; C12F 3/10; B01D 21/01; B01D 21/02; B01D 21/10; B01D 17/02; B01D 17/042; B01D 17/044; B01D 17/047; C07K 1/34; C07K 1/36; C12B 1/02; C12B 1/06; C11B 13/00; Y02E 50/00; Y02E 50/10; Y02E 50/30; Y02W 30/74; Y02P 60/87; A23J 1/16
See application file for complete search history.

(56) References Cited

U.S. PATENT DOCUMENTS

| | | |
|---|---|---|
| 7,692,050 B2 | 4/2010 | Adams et al. |
| 8,722,911 B2 | 5/2014 | Bleyer et al. |
| 9,029,126 B2 | 5/2015 | Bleyer et al. |
| 9,516,891 B1 | 12/2016 | Roa-Espinosa |
| 9,730,463 B1* | 8/2017 | Roa-Espinosa ........... C11B 1/06 |

(Continued)

FOREIGN PATENT DOCUMENTS

KR 20180008074 A * 1/2018 ............. C02F 1/40

OTHER PUBLICATIONS

Machine translation of KR-20180008074-A, pp. 1-11. (Year: 2018).*

*Primary Examiner* — Clare M Perrin
(74) *Attorney, Agent, or Firm* — Reilly Intellectual Property Law Firm

(57) ABSTRACT

Method and system of processing DAF float and other waste streams containing oils, solids and liquid in order to remove them from the waste cycle to be put back into beneficial use.

26 Claims, 4 Drawing Sheets

(56) References Cited

U.S. PATENT DOCUMENTS

| | | | |
|---|---|---|---|
| 10,584,304 B2 | 3/2020 | Schnell et al. | |
| 10,899,647 B1* | 1/2021 | Abdeen | C02F 11/147 |
| 2004/0202771 A1 | 10/2004 | Lee | |
| 2014/0343259 A1* | 11/2014 | Bleyer | C07K 1/145 |
| | | | 530/414 |
| 2017/0015938 A1* | 1/2017 | Xiao | C11B 13/00 |

* cited by examiner

METHOD OF SEPARATING WASTE INTO BIO-AVAILABLE COMPONENTS

There is provided a method and system for separating waste products into available components and more particularly, a method and system of isolating bio-available components such as oil, solids and liquid from DAF units.

The following method is designed to receive and process DAF skim or DAF float (defined below) and other waste streams containing oils, solids and liquids in order to remove them from the waste cycle to be put back into beneficial use.

BACKGROUND

Food processing plants consume large volumes of city water on a daily basis through the manufacturing process. Daily water consumption can range between 100K gallons per day (GPD) to 4M GPD.

Due to the large daily volume of waste water from plant operations containing contaminants, food processing plants are subject to strict water discharge parameters monitored by their local municipality and the state in which they operate. Waste produced from plants such as animal meat processing plants have high BOD (biological oxygen demand), COD (chemical oxygen demand), FOG (fats, oils and grease), SS (suspended solids) and TKN (total Kjeldahl nitrogen) in the waste water.

The preferred method of plant water pre-treatment is Dissolved Air Flotation ("DAF") technology which is well known in the prior art. The primary goal of the DAF is to filter wastewater and reduce BOD, COD, SS, FOG and TKN in the waste water before passing to further treatment or the Publicly Owned Treatment Works (POTW). This is achieved through the removal of the suspended matter in the water, such as oils and solids. Pressurized and dissolved air is released into the water at atmospheric pressure, with the assistance of polymer or coagulant chemical programs, to conglomerate the suspended matter into larger clusters. Those clusters then ascend to the water surface and are captured by a skimming device.

The product that ascends to the water surface of the DAF can be referred to as DAF skim, DAF float or DAF sludge. DAF sludge can create a disposal problem due to the resinous and oily DAF waste sludge, which has nutrients of fat, protein, carbohydrates and others. Fats and proteins are about 10-20% of the oily sludge as a percentage of the homogenized product produced from a typical animal processing plant. For an average poultry processing plant, there are about 15,000 to 30,000 tons (or 30,000,000 to 60,000,000 pounds) of the oily sludge per year. Materials, such as oil, protein, and other soluble components, in the DAF float are very valuable; however, recovery has shown to be inefficient and uneconomical.

SUMMARY

There is provided a multi-stage process for separating a waste stream containing oils, solids and liquids, providing a waste stream in the form of DAF float comprising unrefined oils, solids and liquids, magnetically filtering the DAF float for removal of metal solids, hydrothermally fractionating the DAF float within a heat tank, mixing the DAF float within the heat tank, transferring and heating the DAF float, separating oil phase, solids phase and liquid phase by centrifugation or 3-stage decanting, recovering and transferring the oil phase to a transfer tank, recovering and transferring the solids phase to a load carrier, recovering and transferring the liquid phase containing predominantly water to a stickwater transfer tank, exposing the liquid phase to a thermal exchange, transferring the liquid phase to an equilibrium tank, binding proteins within the liquid with coagulant polymer and pH adjustment, pressing the liquid from suspended solids with a screw press, recovering and transferring isolated solids with a screw conveyor to the load carrier, and recovering and transferring filtered liquid to a filtrate tank for transfer to a treatment plant or polishing DAF. The method also comprises, adding a pre-ground solid component to the DAF float at deliberate ratios, de-watering the DAF float, macerating the DAF float, injecting a stabilizer into the DAF float, adjusting the pH of the DAF float with acid, holding the DAF float at a set temperature for a set period of time within the heat tank, heating the DAF float with at least one pick heater within a range of 190° F. and 210° F., transferring the DAF float to a mechanical separator, decanting the DAF float with the mechanical separator, recovering and transferring the oil phase using an oil screen to a quality control tank, then to a storage tank, and cooling the liquid phase with a thermal exchange device.

DRAWINGS

DETAILED DESCRIPTION

Figure 1:
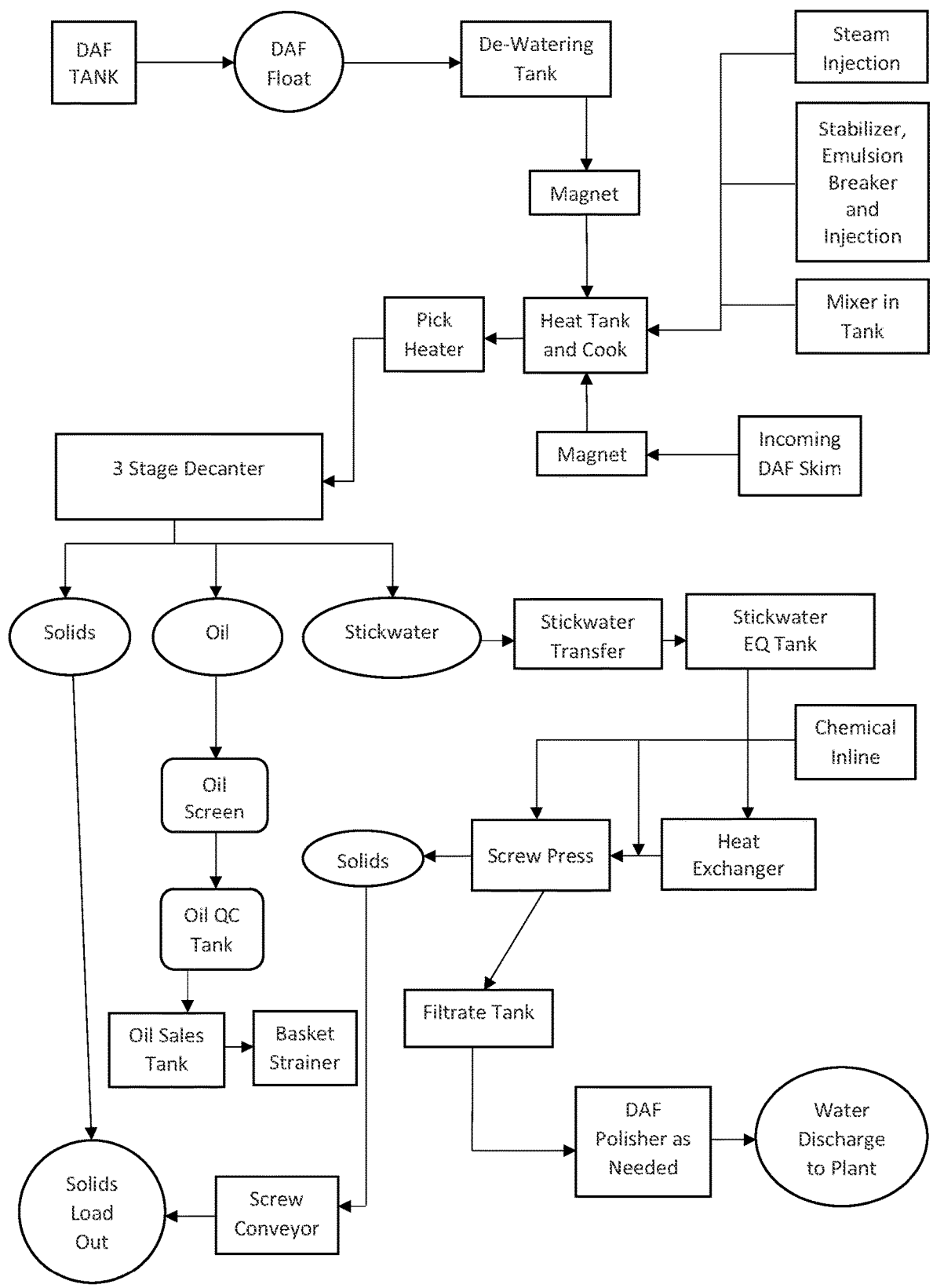
FIG. 1 is a diagram of the method.

The current method involves the steps taken to process DAF float into three components; oil, solids and liquid as shown in FIGS. 1-4. There is provided a method of separating DAF float into bioavailable components as a multi-stage process utilizing hydrothermal injection, stabilizer and/or emulsion injection, homogenization, thermal transfer and holding at consistent heat for a determined period of time, centrifugation and further mechanical processing for optimal separation of components. Additional steps, such as grinding and maceration, may be added without departing from the scope of the disclosure.

The DAF float or DAF skim is obtained through the DAF process which is known in the prior art. The DAF float is comprised of any suspended (floatable) components in the water stream. As a result of the addition of dissolved air, DAF units can also float out products that are suspended but may otherwise sink to the bottom of a vessel in a static gravity situation. The DAF system accelerates and improves on traditional gravity separation. The DAF skim media being collected is suspended materials comprised mainly of unrefined products such as: fats, oils, greases, and proteins with trace amounts of bloods, breading fibers, breading starches, trace metals, feathers, hair and other natural floatable particles resulting from the operations of livestock harvesting, food processing and feed production. The DAF skim media is a relatively homogeneous composition of all those floatable materials in the waste stream.

The DAF float may be combined with trimmings and scrap material from a hopper within the heat tank at deliberate ratios. The hopper contains material that may be further ground at both a macro and micro level to be combined with the DAF float in the heat tanks. Ground trimmings and scrap material preferably should not exceed a mix ration of 1:4 trimmings and scrap material to DAF skim. The DAF float is processed in a de-watering tank, whereby a two-phase decanter or centrifuge may be used and transferred through piping with use of pumps while passing through a magnet system and macerators prior to transfer to heat tanks where it is combined with the trimmings and scrap material. In general, de-watering may be performed with gravity settling, a or gravity dewatering. Multiple pathways may be taken without departing from the scope of the disclosure. For example, FIG. 1 demonstrates use of a magnet system without a grinder/macerator. FIG. 2 demonstrates use of the grinder/macerator using an optional magnet. If trimmings and scrap material are added, it is desirable to add a magnet system for removal of any ferrous material as shown in FIG. 2. In transit, the particle size of the DAF skim is reduced through use of grinders and macerators, to be discussed in more detail A typical/preferred DAF media heat tank transfer pump is a Seepex BN 35-6L, 80-100 GPM 7.5 HP or Netzsch pump and the preferred piping is 4-inch stainless steel but other articles may be used without departing from the scope of this disclosure.

A ferrous magnet system is used upstream of the dewatering or heat tanks to remove any metal particulates from the DAF float or the trimmings. This provides protection for a grinder system to be discussed below and also provides for feed safety due to removal of metal. The preferred form of magnetic system used is the MPI liquid plate magnetic trap, Highland, Michigan or the Bunting pipeline 07 from Bunting of Newton, Kansas that is capable of removing metallic particles from slurries. The optimal magnetic system is designed to magnetically remove metal contaminants from liquid and slurry product streams. A baffle within the trap line directs the product flow toward the magnetic field resulting in magnetized removal of ferrous contaminants. The magnet trap is positioned as a flow-through magnet in-line ahead of a grinder system, if utilized.

The DAF skim particle size may be reduced through an in-line grinder, such as the Muffin Monster, manufactured by JWC Environmental of Costa Mesa, California. The grinder may also be used upstream of the heat tank to homogenize and create uniform particle size for transfer to the heat tank. If large particles are present, a combination of a macrogrinder and micro-grinder may be used to ensure uniform particle size. Trimmings and scrap material, if added, are further homogenized, through the use of grinders and macerators. Preferably a multi-crusher assembly that utilizes rotary lobe pumps from Boerger LLC of Chanhassen, Minnesota, may be used to macerate and grind waste using various cutter/blade configurations along with a first course macerator and optional second chopper to allow for adjustment of the macerated solid size.

The DAF media is transferred at ambient temperature through tanks, pumps and piping to non-pressurized process tanks. It is critical that DAF skim, with or without the addition of trimmings and scrap material, can be efficiently transferred and monitored throughout the process. This requires extensive instrumentation and control for pumping and moving material, measuring volume, accurately recording tank and vessel capacities during processing, and identifying operating temperatures. These specific instrumentation and control components broadly include but are not limited to pumps, flow meters, sensors, switches and temperature detectors as set forth in FIG. 3, by way of example and not limitation. The functionality of these instruments is operated through a motor control center (MCC) with programmable logic controller (PEL PLC).

Once the process tank reaches 3,000 gallons of media, a preservative is injected. Preferably, PfauLox PT-R is injected, a preservative manufactured by Peak Tech, LLC, of Jeffersonville, Indiana, in the preferred amount of 3.59 lbs. per 7,500-gallon processing batch. Most preferable is a preservative with a high flash point, dispersible in fats and oils and that is food grade safe.

The process tank is then filled to its working level of 6,000 to 7,500 gallons. When working level is reached, the tank is isolated by manually activating automated valves where the DAF float is transferred to the second process tank in preparation for batch cooking. The tank with working level media is injected with 100 PSI live steam and the product is cooked until it reaches the preferable temperature of 200° F. with an optimum variation of plus or minus 10° F. Steam diffusers allow enhanced distribution of steam within the tank and allow for more consistent heat transfer throughout the media. Further, if there is insufficient circulation of the DAF float, there are residual polymers that impair the process of effective recovery. The media has an emulsion or rag layer that binds the media to the tank and to water. The steam/heat alters the physiochemical properties by breaking the rag layer to obtain a premium oil product and reduce residual polymers in the tanks.

Upon reaching temperature, the media is held for 30 minutes preferably, but may be held at temperature for up to one hour, to continue the cooking and pasteurization cycles. Correct cooking time and temperature to separate the fat, protein and liquid fractions facilitates decreasing microbial load, volatilizing chemicals, preventing rancidity in the final products, and breaking emulsions and rag layers. Homogenizing of materials during heating is critical and provides many added benefits. Blending or homogenizing is a deliberate result of live steam injection, fluid recirculation and mechanical mixers (in some applications) may also be used. The temperature of the media is monitored by a resistance temperature detector (RTD) along with external temperature checks of the process tank's skin with an infrared thermometer.

When the cooking cycle is complete, the cooked DAF float is transferred by pumps and piping and subject to live steam injection via a heater where the temperature is raised to 205° F., preferably with an optimal range between 200° F. and 210° F. Preferably, a direct steam injection heater is used by Pick Heaters, Inc. of Wisconsin but other forms of heaters may be used without departing from the scope of the disclosure. This step prepares the DAF float for separation in a mechanical separator into high density solids containing proteins, a stickwater liquid containing suspended solids and an oil fraction or phase.

Figure 2:
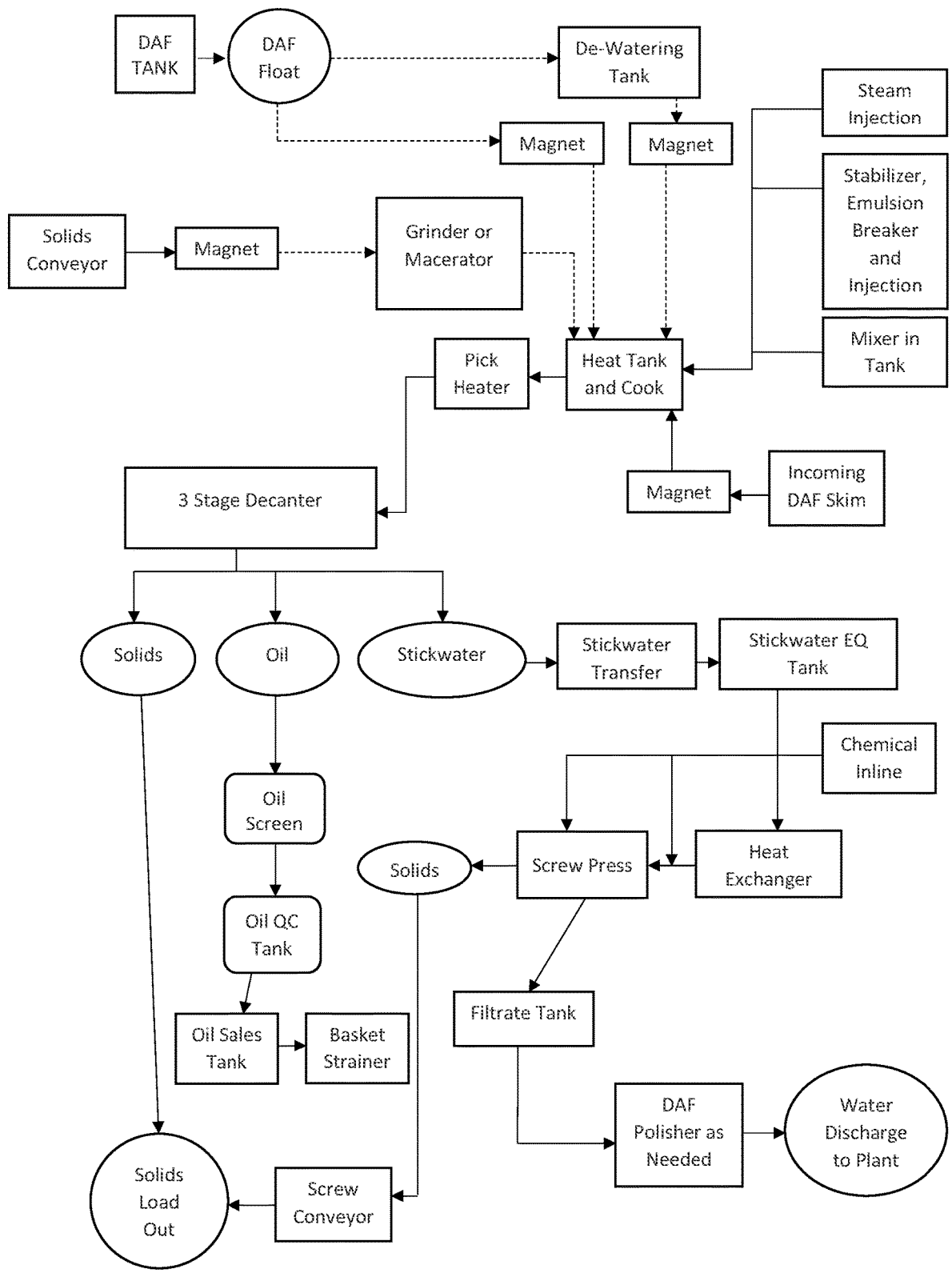
FIG. 2 is a diagram of alternate steps of the method.
Figure 3:
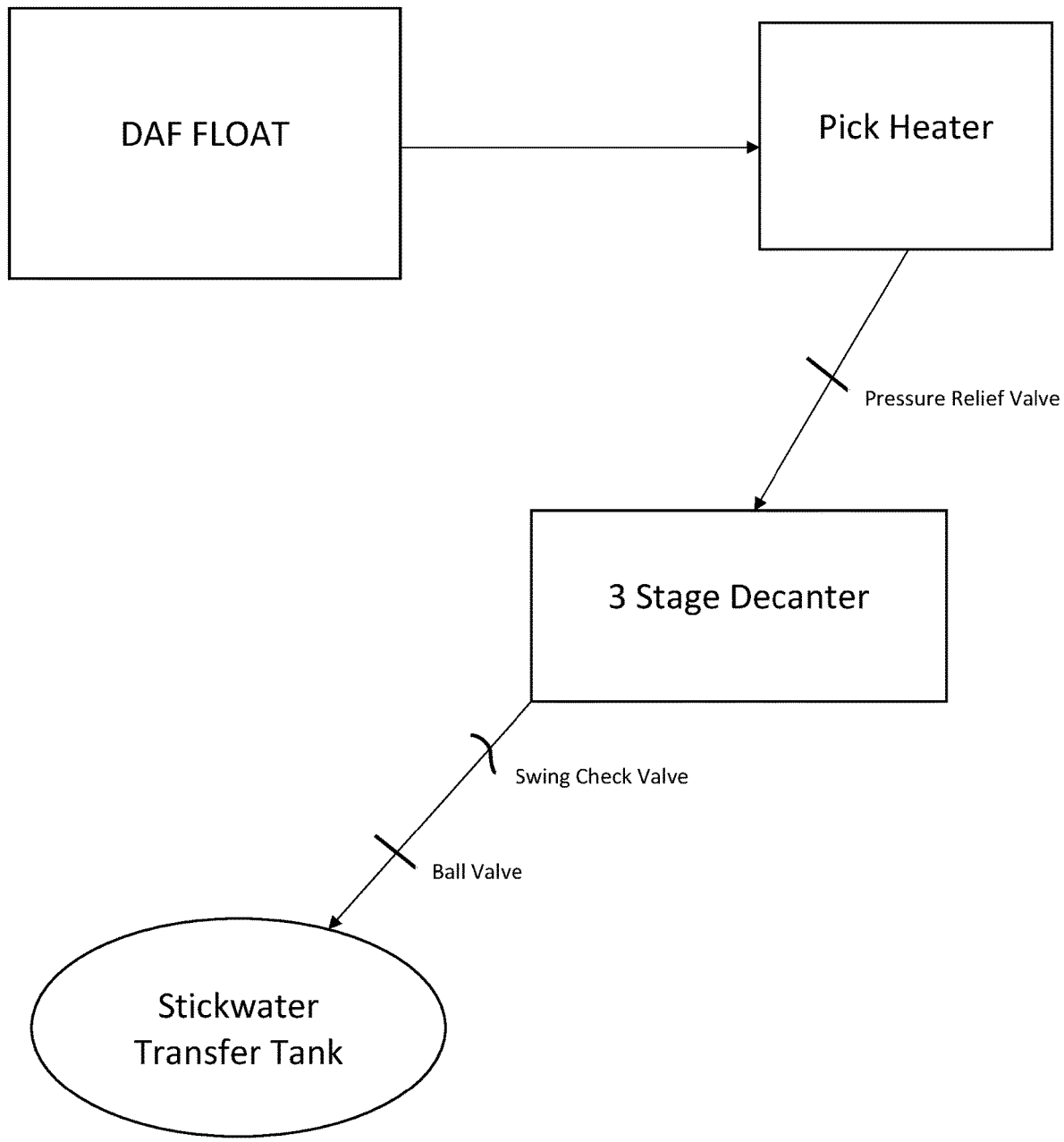
FIG. 3 is a detailed diagram of a portion of the method.

At final temperature, the media is processed through continuous flow to a 3-phase mechanical separator for centrifugation as shown in FIGS. 1-3. The preferred separator, but not by limitation, is a Flottweg Tricanter®, Model Z5E, manufactured by Flottweg SE of Vilsbiburg, Germany, but other separators may be used without departing from the scope of the disclosure. Separators are 3-phase decanter centrifuges allowing for continuous separation of three phases (solid-liquid-liquid) in a single process. Centrifugation and hydrocyclones as well as vertical high speed disc stack, may be used to accomplish separation. Separation of the oily sludge is achieved due to the fact that the media contains components with different densities thereby achieving maximum liquid (stick water), oil (animal fat, white grease, tallow, yellow grease, for example) and solids (protein, animal by-product meal) separation. The centrifuge simultaneously separates two immiscible liquids with different densities, liquid and oil, and one solid phase, creating three phases. Variations of mechanical separation may be used without departing from the scope of this disclosure. For example, separation may be accomplished with gravity forces using a high g-force device such as centrifugation, hydrocyclones. Other methods of separation may also be used such as dissolved air flotation, screens, filtration membranes or any other separation method. Furthermore, it is not necessary to perform the separation in one step but multiple steps may be used to isolate desired products.

Upon separation of the three phases, there are three different streams of media for final processing:

Oil: The oil is separated from the liquid due to differences in density as described above. Once separated, the oil is discharged from the decanter centrifuge to a small transfer tank. Once full the oil is pumped, via pipeline, through a dual fine-mesh screen basket strainer system designed to remove foreign particles. The preferred form of mesh filter is a hanging basket strainer with a core mesh filter. The mesh size ranges from 250 microns to 300 microns, preferably. The oil then settles in a 500-gallon quality control tank for visual inspection prior to being pumped to a 10,000-gallon oil sales tank. Table 1 represents a sample analysis of extracted oil with the parameters of free fatty acids (FFA) and moisture, impurities and unsaponifiables (MIU) set forth. Typical results of DAF float analysis produce an FFA in the range of 15-30% which is one indicator of rancidity.

TABLE 1

| PARAMETER | RESULTS |
| --- | --- |
| MOISTURE | 0.68% |
| INSOLUBLE MATTER | 0.12% |
| UNSAPONIFIABLE MATTER | 1.87% |
| Total MIU | 2.67% |
| FREE FATTY ACID (FFA) | 5.1% |

Solids: The solids recovered from this phase are generally in the form of proteins and are gravity discharged from the centrifuge and carried by a screw conveyor or holding tote for manual transfer to a trailer. The solids may be hauled off-site and land applied as a nutrient rich fertilizer, sent to a landfill or digester by a third-party contractor, or monetized as a large animal feed ingredient. Table 2 represents a sample analysis of 3-stage decanter proteins. Protein availability from the DAF Sludge source described herein has historically been unavailable to the market because of limiting technical advancements/availability/options. As shown in Table 3, the proteins provide a good nutrient dense ration or feedstock suitable primarily for large animal feed including hogs. Other secondary uses are fertilizer or compost, which still utilize the high nutrient content. In addition to the creation of this product through the process, specific points of competitive advantage within the analysis are a high crude protein content and the existence of Lysine which is a critical amino acid for the development of adolescent animals.

TABLE 2

| ANALYTE | AS RECEIVED | | DRY BASIS | |
| --- | --- | --- | --- | --- |
| Moisture | 67.45 | % | | |
| Fat, Ethyl Ether | 3.81 | % | 11.71 | % |
| Fiber, Crude Ankom | 5.79 | % | 17.79 | % |
| Fiber, Acid Detergent | 6.47 | % | 19.88 | % |
| Protein N × 6.25 | 16.22 | % | 49.83 | % |
| Phosphorus | 0.1428 | % | 0.4387 | % |
| Copper | 15.41 | ppm | 47.34 | ppm |
| Calcium | 0.11 | % | 0.33 | % |

TABLE 2-continued

| ANALYTE | AS RECEIVED | | DRY BASIS | |
| --- | --- | --- | --- | --- |
| Potassium | 0.02 | % | 0.06 | % |
| Sulfur | 2029 | ppm | 6233 | ppm |
| Lysine | 1.130 | % | 3.472 | % |
| Selenium | 0.354 | mg/Kg | 1.088 | mg/Kg |

TABLE 3

GUARANTEED ANALYSIS (as-fed)

Protein 15% min.
Fat 3% min.
Fiber 7.0% max.
Moisture 68% max.
Lysine 1.0% min
TYPICAL ANALYSIS (90% dry)

Protein 40-44%
Lysine 2.8%-3.1%
Fat 10%
Fiber 13%
90% Dry Matter
Copper 25 ppm
Sulfur 0.50%
Selenium 1.0 ppm
Salmonella-Negative
Aspartic acid 3.6%
Cysteine 0.9%
Glutamic acid 4.7%
Glycine 2.0%
Histidine 1.3%
Isoleucine 1.9%
Leucine 3.7%
Lysine 3.0%
Methionine 0.8%
Phenylalanine 2.0%
Serine 1.9%
Taurine n/d
Threonine 1.9%
Tryptophan 0.4%
Tyrosine 1.0%
Valine 2.5%
Ingredients Animal By-Product Meal,
Proplene Glycol, BHA
(preservative), Citric Acid
(preservative, Glycerin Liquid: The nutrient dense liquid recovered may be referred to as centrate or stickwater and consists largely of the moisture in the media but also contains small percentages of oil and solids. Due to the character of the solids in the stickwater they are referred to as 'pin floc.' Pin floc is a fine particle with high organic value but it is also a uniquely challenging waste stream to treat and recover the protein due to its volatile nature. The pinfloc solids are suspended solids and quickly disperse into the water phase upon agitation.

Figure 4:
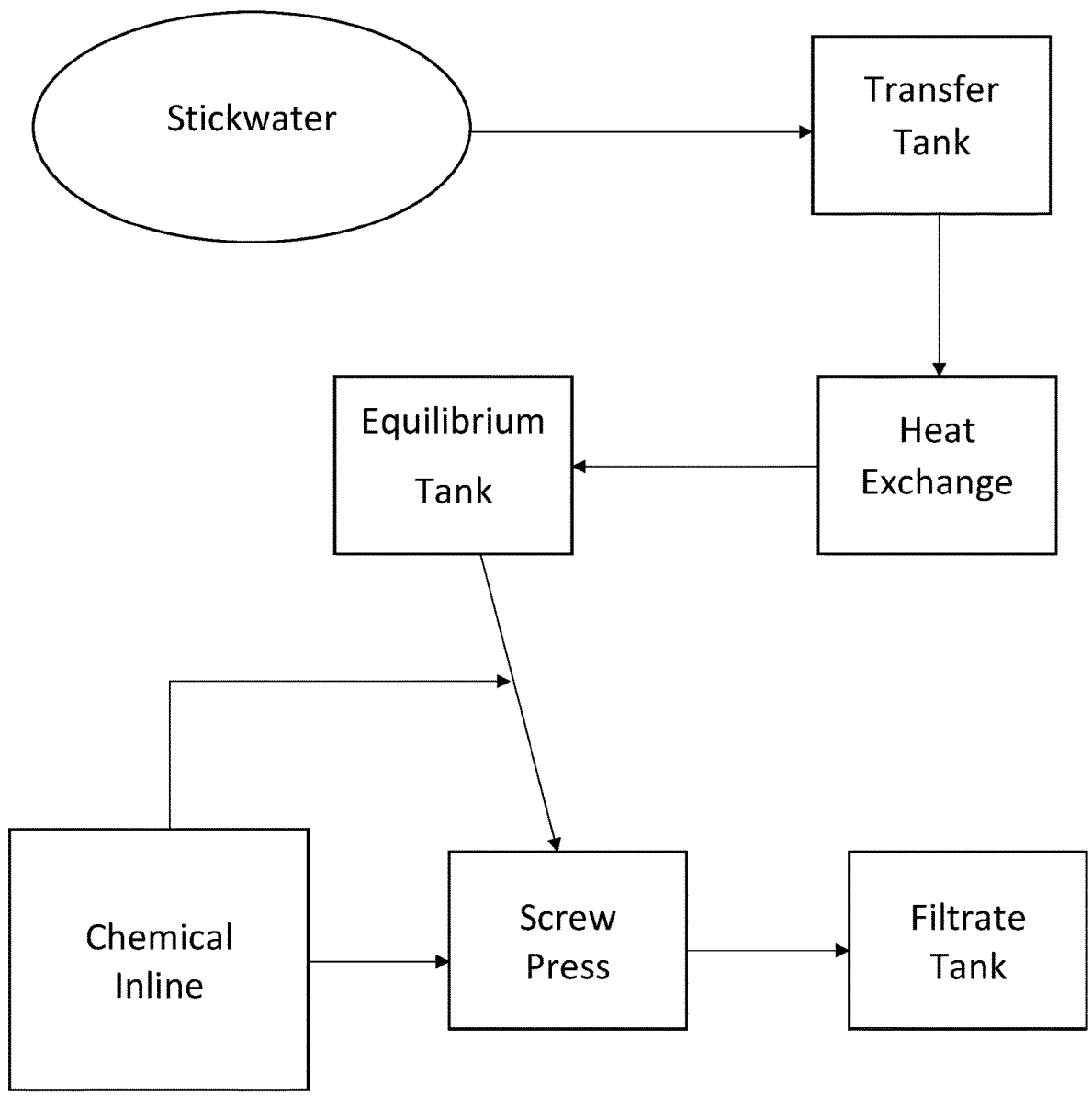
FIG. 4 is a detailed diagram of a portion of the method.

One method of recovering components of the liquid phase is shown in FIG. 4. In this phase, the stickwater is transferred to a transfer tank and subjected to a thermal exchange device to facilitate further disruption and separation. This may be accomplished with direct dilution and retention time or by heat exchangers, preferably a spiral heat exchange, whereby a circular unit allows media to flow in counter directions to create a thermal exchange. The preferable heat exchanger, but not by limitation, is an Alfa Laval, Welded Spiral Heat Exchanger, manufactured by Alfa Laval of Lund, Sweden.

The stickwater is then transferred to an equilibrium tank in order to balance flow and surges. In process, the equilibrium tank is filled until it is volumetrically ready to process the stickwater through mechanical separation in order to remove suspended solids. Prior to the stream being passed through a screw press, the media may be exposed to a chemical agent such as a coagulant polymer which is designed to facilitate the binding of the fine suspended solids that are within the stickwater phase. Offered as an example, but not by way of limitation, the coagulant polymer is preferably an organic coagulant with or without anionic and cationic polymers. Again, by way of example, the media may be exposed to a range of 65 ppm to 90 ppm of anionic polymer such as the Polytec PT-418 and 30 ppm to 50 ppm of a cationic polymer such as Polytec 2162. The media should also have a pH between 6 to 8, therefore, pH adjustment increase may be necessary with lime, for example, to regulate the pH levels. The preferred use of a screw press may have variability in the parameters including screen size, screw speed, backpressure and screw press configuration. Preferably, the pressing process imparts back pressure and compression to the isolated media producing a liquid stream and a solid stream. The screw press may be a Mivalt Press or Huber Press, if needed.

Once final separation of the solids occurs, the solids are transferred and combined with the previously separated solids from the 3-stage decanter and the liquid is transferred to a filtrate tank for discharge to a water treatment plant or to be further polished with a DAF unit or to be used as a fertilizer. The filtrate recovered from the screw press generally carries a significantly reduced load of BOD, COD, SS, FOG and TKN for discharge.

There are extensive material transfer and instrumentation components necessary to perform on the process described herein. These components include but are not limited to offload pumps, transfer pumps, recirculation pumps, injection pumps, automated valves, manual valves, actuated valves, check valves, flow meters, level sensors, ultrasonic sensors, float switches and resistance temperature detectors. Successful processing throughout the system is dependent on accuracy and functionality of these components which are tied into a specifically designed motor control center (MCC) with programmable logic controller (PCL).

While the present method and system has been described, it will be appreciated and understood that modifications may be made without departing, from the true spirit and scope.

We claim:

1. A multi-stage process for separating a waste stream containing oils, solids and liquids, the steps comprising:
    providing a waste stream in the form of DAF float comprising unrefined oils, solids and liquids;
    magnetically filtering said DAF float for removal of metal solids;
    hydrothermally fractionating said DAF float within a heat tank;
    transferring and heating said DAF float;
    separating oil phase, solids phase and liquid phase with a separation member;
    recovering and transferring said liquid phase containing predominantly water to a stickwater transfer tank;
    exposing said liquid phase to a thermal exchange;
    binding proteins within said liquid phase with a chemical agent;
    pressing said liquid phase from suspended solids with a screw press; and
    recovering and transferring filtered liquid to a filtrate tank for transfer to a treatment plant or polishing DAF.

2. The multi-stage process according to claim 1 wherein the process further comprises adding a pre-ground solid component to said DAF float at deliberate ratios.

3. The multi-stage process according to claim 1 wherein the process further comprises de-watering said DAF float.

4. The multi-stage process according to claim 1 wherein the process further comprises macerating said DAF float.

5. The multi-stage process according to claim 1 wherein the process further comprises injecting a stabilizer into said DAF float.

6. The multi-stage process according to claim 1 wherein the process further comprises holding said DAF float at a set temperature for a set period of time within said heat tank.

7. The multi-stage process according to claim 1 wherein said step process of transferring and heating said DAF float further comprises use of at least one pick heater.

8. The multi-stage process according to claim 1 wherein the process further comprises recovering and transferring said oil phase to a transfer tank and said solids phase to a load carrier.

9. The multi-stage process according to claim 1 wherein the process further comprises transferring said DAF float to the separation member.

10. The multi-stage process according to claim 9 wherein the process further comprises decanting said DAF float with the separation member.

11. The multi-stage process according to claim 1 wherein the process further comprises recovering and transferring said oil phase using an oil screen to a quality control tank.

12. The multi-stage process according to claim 1 wherein the process further comprises cooling said liquid phase with a thermal exchange unit.

13. The multi-stage process according to claim 1 wherein the process further comprises adjusting the pH of said liquid phase prior to pressing.

14. A method of separating oils, solids and liquids from a waste stream, the method comprising:
    providing a waste stream in the form of DAF float comprising unrefined oils, solids and liquids;
    magnetically filtering said DAF float for removal of metal solids;
    hydrothermally fractionating said DAF float within a heat tank;
    holding said DAF float at a set temperature for a set period of time within said heat tank;
    transferring said DAF float to a steam injection heater;
    heating said DAF float within a range of 190° F. and 210° F.;
    transferring said DAF float to a mechanical separator;
    decanting said DAF float into a solid phase, an oil phase and a stickwater phase;
    recovering and transferring said oil phase to a transfer tank;
    recovering and transferring said solids phase to a load carrier;
    recovering and transferring said stickwater phase containing predominantly water to a stickwater transfer tank;
    cooling said stickwater phase with a thermal exchanger;
    adjusting pH of said stickwater phase and transferring said stickwater phase to an equilibrium tank;
    pressing said stickwater phase with a screw press for separation of a second liquid phase and a second solid phase; and
    recovering and transferring filtered liquid to a filtrate tank for transfer to a treatment plant.

15. The method according to claim 14 wherein the process further comprises adding a pre-ground solid component to said DAF float at deliberate ratios.

16. The method according to claim 14 wherein the process further comprises de-watering said DAF float.

17. The method according to claim 14 wherein the steps-include process further comprises macerating said DAF float.

18. The method according to claim 14 wherein the process further comprises injecting a stabilizer into said DAF float.

19. The method according to claim 14 wherein the process further comprises recovering oil with an oil screen and transferring said recovered oil to a quality control tank.

20. The method according to claim 14 wherein the process further comprises binding proteins within said liquid with a chemical agent.

21. The method according to claim 14 wherein the process further comprises adjusting the pH of said liquid phase within a range of 6 to 9.

22. A method of extracting liquids, oils and solids from DAF float whereby the DAF float has been processed through a mechanical separator, the steps comprising:
   recovering and transferring a refined oil phase to a transfer tank;
   recovering and transferring refined solids to a load carrier;
   recovering and transferring a refined stickwater phase to a stickwater transfer tank;
   transferring the stickwater phase to an equilibrium tank;
   adjusting the pH of the stickwater phase;
   binding proteins within said stickwater phase with a chemical agent;
   pressing the stickwater phase with a screw press; and
   recovering and transferring filtered liquid to a filtrate tank for transfer to a treatment plant.

23. The method of extraction according to claim 22 wherein said filtered liquid is returned to the DAF float.

24. The method according to claim 23 wherein the process further comprises recovering and transferring filtrate to a filtrate tank.

25. The method according to claim 22 wherein the process further comprises cooling the stickwater phase with a thermal exchanger.

26. The method according to claim 22 wherein said chemical agent is selected from the group consisting of polymer coagulants, cationic polymers and anionic polymers.

* * * * *